United States Patent
Lorigny et al.

(10) Patent No.: US 6,666,612 B2
(45) Date of Patent: Dec. 23, 2003

(54) FLEXURAL PIVOT

(75) Inventors: Eric Pascal Jean Lorigny, Beauville (FR); Eric Lionel Meizel, Mandelieu (FR)

(73) Assignees: Centre National d'Etudes Spatiales, Paris (FR); Be System Etudes Cao Realisations, Mandelieu (FR)

( * ) Notice: Subject to any disclaimer, the term of this patent is extended or adjusted under 35 U.S.C. 154(b) by 0 days.

(21) Appl. No.: 10/082,233

(22) Filed: Feb. 26, 2002

(65) Prior Publication Data

US 2002/0084563 A1 Jul. 4, 2002

Related U.S. Application Data

(63) Continuation of application No. PCT/FR00/02407, filed on Aug. 31, 2000, now abandoned.

(30) Foreign Application Priority Data

Aug. 31, 1999 (FR) .............................. 99 10927

(51) Int. Cl.$^7$ ............................................. F16F 01/18
(52) U.S. Cl. ..................... 403/291; 267/160; 403/329; 403/330
(58) Field of Search ................. 403/339, 340, 403/325, 327, 329, 331, 373, 374.1, 291; 464/77, 100, 101; 267/160, 227, 229, 36.1, 179; 16/221, 225–27, 286

(56) References Cited

U.S. PATENT DOCUMENTS

| | | | | |
|---|---|---|---|---|
| 2,757,050 A | | 7/1956 | Weber et al. | |
| 3,073,584 A | * | 1/1963 | Troeger | 267/160 |
| 3,124,873 A | * | 3/1964 | Troeger | 267/160 X |
| 3,142,888 A | * | 8/1964 | Troeger | 267/160 X |
| 3,181,851 A | | 5/1965 | Troeger | |
| 3,181,918 A | * | 5/1965 | Troeger | 267/160 X |
| 3,252,696 A | * | 5/1966 | Friedel | 267/160 |
| 3,277,555 A | * | 10/1966 | Kutash | 267/160 X |
| 3,319,951 A | * | 5/1967 | Seelig | 267/160 |
| 3,360,255 A | * | 12/1967 | Ormond | 267/160 X |
| 3,479,107 A | * | 11/1969 | Blythe et al. | 267/160 X |
| 3,807,029 A | * | 4/1974 | Troeger | 267/160 X |
| 3,811,665 A | * | 5/1974 | Seelig | 267/160 |
| 3,813,089 A | * | 5/1974 | Troeger | 267/160 |
| 3,825,992 A | * | 7/1974 | Troeger | 267/160 X |
| 3,909,077 A | * | 9/1975 | Leonarduzzi | 267/160 X |
| 4,122,689 A | * | 10/1978 | Beardmore | |
| 4,336,967 A | * | 6/1982 | Hojo et al. | |
| 4,405,184 A | * | 9/1983 | Bahiman | |
| 4,444,442 A | * | 4/1984 | Hojo et al. | |
| 4,499,778 A | * | 2/1985 | Westhaver et al. | |
| 4,536,042 A | | 8/1985 | Falconer | |
| 4,637,596 A | * | 1/1987 | Lewis | 267/160 |
| 4,655,629 A | * | 4/1987 | Flaherty | 403/291 |
| 4,702,636 A | * | 10/1987 | Guile | |
| 4,812,072 A | * | 3/1989 | Brooks | 464/100 X |
| 4,997,123 A | * | 3/1991 | Backus et al. | |
| 5,061,107 A | * | 10/1991 | Brooks | 464/100 X |
| 5,620,169 A | * | 4/1997 | Payne | 267/160 |

FOREIGN PATENT DOCUMENTS

| | | |
|---|---|---|
| EP | 0 459 057 | 12/1991 |
| FR | 2 199 370 | 4/1974 |
| FR | 2 446 952 | 8/1980 |
| GB | 2 156 899 | 10/1985 |

* cited by examiner

Primary Examiner—Gregory J. Binda
Assistant Examiner—Ryan M. Flandro
(74) Attorney, Agent, or Firm—Jacobson Holman PLLC

(57) ABSTRACT

A pivot has identical first and second members partially engaged in each other and mobile in rotation relative to each other about a common axis, against the action of at least two return leaf springs each having first and second ends anchored in the first and second parts, respectively, by being wedged inside them.

15 Claims, 2 Drawing Sheets

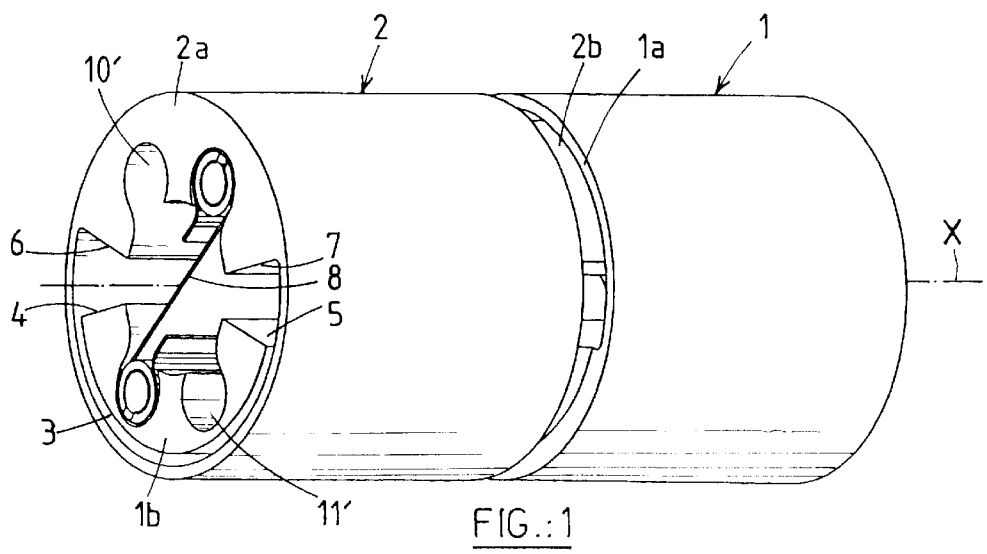
FIG.:1
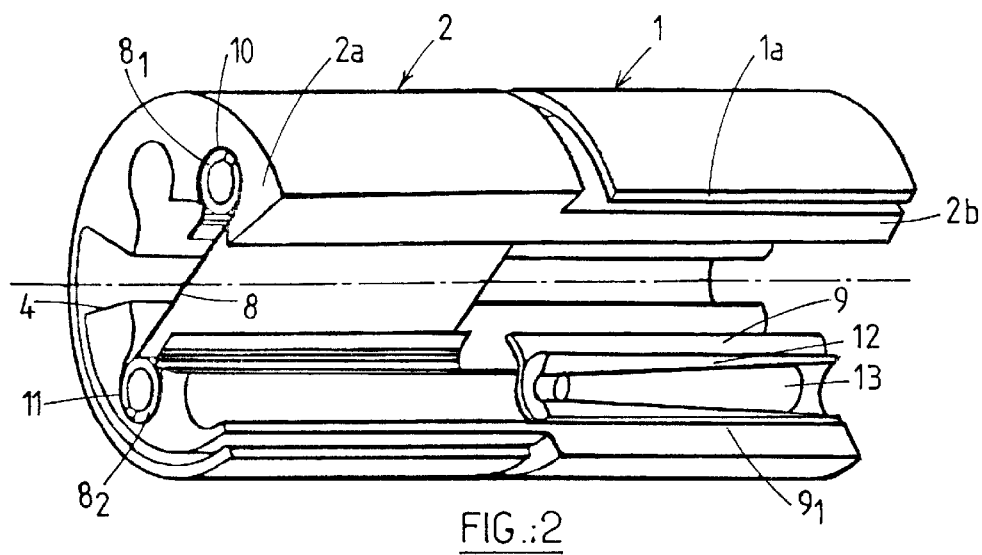
FIG.:2
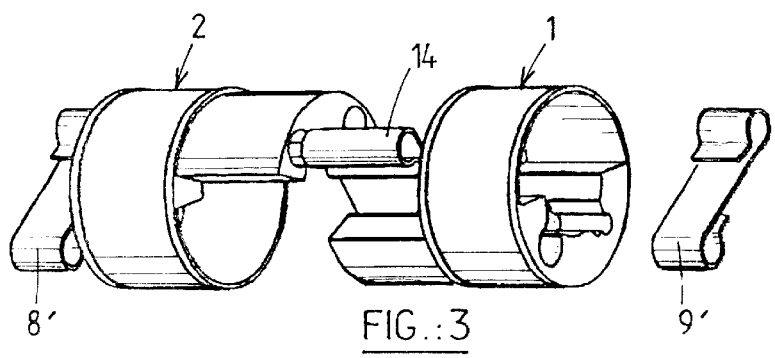
FIG.:3

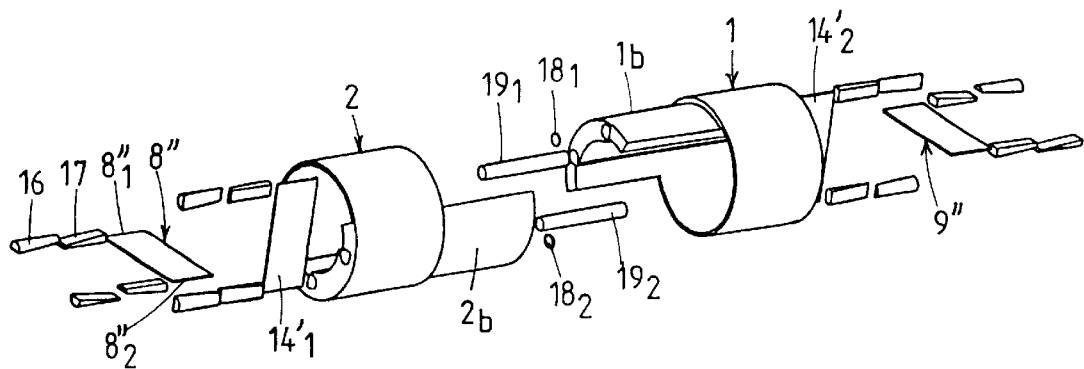
FIG.:4
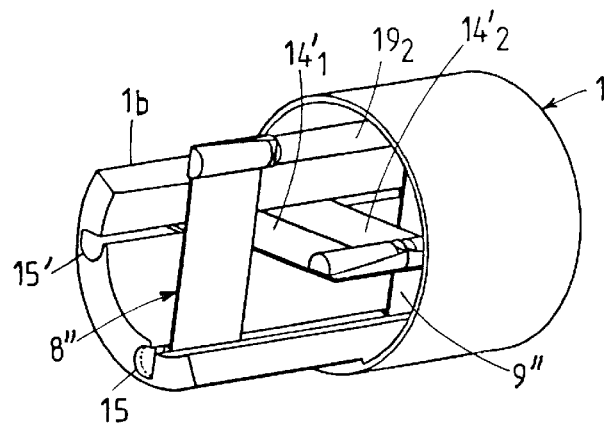
FIG.:5
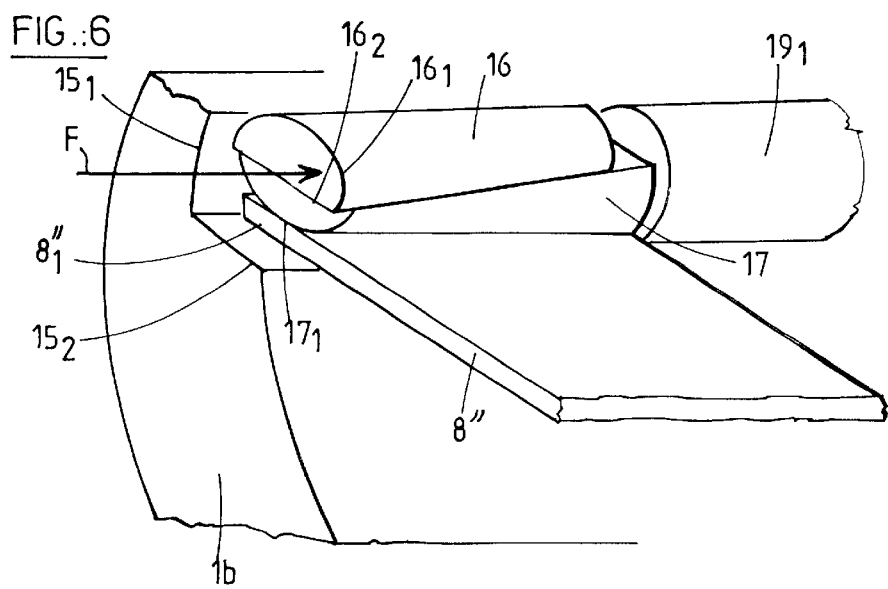
FIG.:6

FLEXURAL PIVOT

This application is a continuation of International PCT Application N° PCT/FR00/02407 filed on Aug. 31, 2000, NOW ABANDONED which designated the United States.

BACKGROUND OF THE INVENTION

1. Field of the Invention

The present invention relates to a pivot with leaf springs. The pivot includes identical first and second members partially engaged in each other and rotatable relative to each other about a common axis, against the action of a return leaf spring which has first and second ends anchored in said first and second members, respectively.

2. Description of the Prior Art

Pivots of the above type are used in many applications where a device or member is mounted so that it can rotate through a small angle against a return force. Examples of such devices or members include measuring instrument pointers, oscillating mirrors, the platforms of scales, etc.

French patent No. 2 199 370 discloses a pivot of the above kind including two identical and axially aligned sleeves; each sleeve has an extension designed to be accommodated in a recessed portion of the other sleeve. Two crossed leaf springs elastically couple the two sleeves, which can turn relative to each other through a small angle and against the action of return forces exerted on the sleeves by the leaf springs. The leaf springs are anchored in axial grooves formed in the two sleeves.

The leaf springs can be welded into the grooves if the leaf springs and the sleeves are made of metal. However, the heating of the leaf springs during welding degrades their mechanical characteristics uncontrollably, especially when they are very thin, as is the case when the pivot is used to mount a delicate mechanical member such as a pointer, for example. This can falsify the equilibrium or rest position of the supported member and degrade the reliability of the assembly.

An adhesive can also be used to fix the leaf springs in the grooves. The physical and chemical characteristics of the adhesives unfortunately deteriorate over time or because of the environment (vacuum, extreme temperatures), especially in space.

A specific object of the present invention is to provide a pivot with flexible connections of the type described in the preamble to this description that is free of drawbacks referred to hereinabove.

SUMMARY OF THE INVENTION

The above object of the invention and others that will become apparent on reading the following description are achieved by a pivot with flexible connections including identical first and second members partly engaged in each other and rotatable relative to each other about a common axis against the action of a return leaf spring having first and second ends anchored in the first and second members, respectively.

In one embodiment of the invention, each of the ends of the leaf spring is wedged in an axial housing provided in one of the members, between a wall portion of the housing and a pair of superposed wedges gripped between another wall portion of the housing and the leaf spring.

In another embodiment of the present invention each of said leaf spring ends is shaped as a loop designed to be received in an axial housing of complementary shape in one of said members and a conical pin is forced inside said loop to expand it and wedge it in the housing.

An axially split cylindrical ring is advantageously slid into said looped end, between it and said conical pin.

Other features and advantages of the present invention will become apparent on reading the following description and examining the accompanying drawings.

BRIEF DESCRIPTION OF THE DRAWINGS

FIG. 1 is a perspective view of a first embodiment of a pivot according to the invention with two leaf springs.

FIG. 2 is a partly cut-away view of the pivot shown in FIG. 1, revealing its internal structure.

FIG. 3 is an exploded view of a second embodiment of the present invention with three leaf springs.

FIG. 4 is an exploded view of a third embodiment of the invention.

FIG. 5 is a partly cut-away view of the FIG. 4 embodiment when assembled.

FIG. 6 shows a detail of the embodiment shown in FIGS. 4 and 5.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The embodiment of a pivot in accordance with the invention shown in FIG. 1 includes identical first and second members 1, 2 that are partly slid inside each other so that together they form a substantially circularly cylindrical pivot allowing one of the two members to rotate relative to the other about the axis X of the pivot.

The member 1 is formed of two parts 1a, 1b aligned with each other along the axis X. The portion 1a has a circularly cylindrical outside surface and a substantially semicylindrical recess. The portion 1b takes the form of a foot with a substantially semicylindrical outside shape.

The member 2 is formed of portions 2a, 2b with exactly the same geometry as the respective portions 1a, 1b of the member 1.

As shown in FIG. 1, the members 1 and 2 are slid axially inside each other so that the foot 1b, 2b of one of them is accommodated in the substantially semicylindrical recess in the respective portion 2a, 1a of the other.

As can also be seen in FIG. 1, the foot 1b of the member 1 has a circularly cylindrical surface 3 whose radius is slightly less than that of the recess in the member 2a and two flat axial surfaces 4, 5 parallel to the axis X over the full height of the foot 1b. The surfaces 4, 5 are designed to cooperate with similar surfaces 6, 7 in the recess in the portion 2a to serve as abutments defining the maximum relative angular movement of the members 1, 2 relative to each other.

Pivots with leaf springs are essentially used to support members which rotate through a small angle, such as an oscillating mirror for sweeping a light beam over a surface, for example. The abutment surfaces 4, 5, 6, 7 define the limits of such rotation accurately.

As indicated above, the foot 1b of the member 1 and the recess in the portion 2a of the member 2 are substantially semicylindrical, rather than strictly semicylindrical, because the surfaces 4, 5, on the one hand, and the surfaces 6, 7, on the other hand, are not able to lie in a common plane passing through the axis X; their inclination relative to each other defines the permitted amplitude of their relative rotation.

Of course, the foot 2b of the member 2 is shaped like the foot 1b of the member 1. Likewise the portions 2a and 1a of the members 2 and 1, respectively.

Two leaf springs 8 and 9, seen more completely in the partly cut-away view of FIG. 2, couple the members 1 and 2. Thus the leaf spring 8 is mounted between the foot 1b of the member 1 and the portion 2a of the member 2 and the leaf spring 9 is mounted between the foot 2b of the member 2 and the portion 1a of the member 1. The planes of the leaf springs 8 and 9 are axial and crossed; they are preferably perpendicular to each other.

In accordance with the present invention, the leaf springs 8 and 9 have ends in the form of respective open loops $8_1$, $8_2$ and $9_1$, $9_2$ so that they can be inserted in complementary axial cylindrical housings in the members that they couple. Accordingly, as shown in FIG. 2, the looped ends $8_1$, $8_2$ of the leaf spring 8 are slid into the housings 10, 11 in the portion 2a of the member 2 and in the foot 1b of the member 1, respectively. The leaf spring 9 is similarly disposed with one of its ends in the axial housing 10' and the other in the axial housing 11'. Note, incidentally, that the axial housings 10, 11 and 10', 11' extend from one end of the pivot to the other; this is to facilitate fabrication of the members 1, 2.

Clearly rotation of one of the members 1, 2 relative to the other flexes the leaf springs 8, 9, which then apply to the members to which they are fastened a return torque toward an angular rest position in which the leaf springs are not subject to any flexing force.

Although in principle the pivot could include only one leaf spring, it is preferable to use an arrangement with two leaf springs to compensate any drift that could affect the stiffness of the leaf springs in the long term, so improving axial guidance by the more balanced radial stiffness obtained with this kind of arrangement.

According to one important feature of the present invention, the looped ends of the leaf springs 8, 9 are anchored into the members that they couple by wedging them into the latter. As is more clearly apparent in FIG. 2, in the partly cut-away view of the looped end $9_1$ of the leaf spring 9, the wedging effect is obtained by means of a split cylindrical ring 12 and a conical pin 13 slid successively into the looped end after installing the latter in the axial housing provided to receive it in the member 2.

The diameter of the split ring 12 is chosen to allow it to be inserted into the looped end $9_1$. The ring 12 has a conical interior matching the conical shape of the pin 13.

Inserting the conical pin 13 into the ring 12 expands the ring, which then wedges the looped end $9_1$ in the housing that receives it, to immobilize it there.

The conical internal shape of the ring 12 improves the wedging effect because it distributes uniformly the clamping forces needed to obtain the wedging effect from one end to the other of the looped end portion.

When assembling the pivot, the ring 12 also isolates the leaf spring from the conical pin 13 with respect to axial forces that only the latter could transmit to it. Axial forces could shift, deform or prestress the leaf spring, to the detriment of reproducible performance of the pivot.

The four looped end portions of the leaf springs 8 and 9 can therefore be fixed into the pivot according to the invention.

FIG. 3 shows a second embodiment of the invention constituting a variant of the pivot shown in FIG. 2. In this figure and the subsequent figures, reference numbers identical to those used in the previous figures, possibly with an appended ' or ", indicate identical or similar elements or members. The FIG. 3 pivot differs from the FIG. 2 pivot essentially in that the members 1 and 2 are coupled by three leaf springs 8', 9' and 14, rather than by only two leaf springs. In the FIG. 3 exploded view, it can be seen that a central leaf spring 14 whose axial width is substantially twice that of the end leaf springs 8 and 9 is slid into the pivot between the latter, whose flat portions are substantially coplanar and at 90° to that of the central leaf spring 14. The ends of the leaf springs are all fixed by wedging them using rings like the ring 12 and pins like the pin 13, which are not shown in order to simplify the figure. The central leaf spring 14 then straddles the middle part of the pivot and increases its resistance to radial forces.

A third embodiment of a pivot according to the invention is described next with reference to FIGS. 4 to 6. In the FIG. 4 exploded view it can be seen that this embodiment, like that of FIG. 3, includes three leaf springs or groups of leaf springs 8", ($14'_1$, $14'_2$) and 9".

In the FIG. 5 view of the assembled pivot, in which the member 2 is cut away, it can be seen that the two central leaf springs $14'_1$, $14'_2$ are adjacent and in contact. They are therefore equivalent to a single leaf spring with a width equal to the sum of those of the leaf springs $14'_1$, $14'_2$. Dividing the single leaf spring into two portions can facilitate its fabrication.

The leaf springs 8" ($14'_1$, $14'_2$) and 9" are perfectly flat and thus differ from those of the embodiments shown in FIGS. 1 to 3 in the absence of loops at the ends.

They further differ in terms of the means used to immobilize their edges by wedging them in the axial housings of the members 1 and 2 that receive them. Those means are shown in more detail in FIG. 6, which shows by way of example the wedging of one end $8''_1$, of the leaf spring 8" into one of the two axial housings 15, 15' of the member 1, here the housing $15_1$.

In this figure it can be seen that the axial housing 15 has a wall consisting of a cylindrical portion $15_1$ and a flat portion $15_2$ on which the end $8''_1$ of the leaf spring 8" bears.

To immobilize the end of this leaf spring against this flat portion, the invention uses superposed first and second wedges 16 and 17 which are conformed to co-operate to clamp the leaf spring with a "wedging effect".

To this end the wedge 16 has a cylindrical lateral portion $16_1$ that substantially conforms to the cylindrical portion $15_1$ of the housing 15 and a flat surface $16_2$ inclined to the axis of its cylindrical lateral surface.

The wedge 17 generally conforms to the wedge 16 but further includes a second flat surface $17_1$ parallel to the axis of its cylindrical surface. The second flat surface is adapted to be pressed against the leaf spring 8", as shown in FIG. 6.

To assemble the various components of the pivot shown in FIG. 4, first of all the members 1 and 2 are nested one inside the other, with their respective axial housings aligned. The leaf springs $14'_1$, $14'_2$ are then slid into the latter, with two thin washers $18_1$, $18_2$ between them to prevent their adjacent edges rubbing. As an alternative to this, as mentioned above, the two leaf springs $14'_1$, $14'_2$ could be replaced by a single leaf spring of twice the width.

Cylindrical keys $19_1$, $19_2$ are then slid into the axial housings to receive the ends of the leaf springs 8" and 9", as explained later, to fix the wedges.

The leaf springs 8" and 9" are then inserted in the axial housings, followed by the respective pairs of wedges 16, 17, the wedges of each pair bearing on each other through their flat faces inclined to the axes of their cylindrical surfaces. The length of the keys $19_1$, $19_2$ is adjusted so that, after the leaf springs 8", 9" and the wedges 17 have been abutted against the keys, the wedges 16, 17 are substantially flush with the outlets of the axial housings 15, 15'.

Hitting a wedge 16 in the direction of the arrow F (see FIG. 6) with the corresponding wedge at the other end of the axial housing 15 held in place by an abutment in that housing causes the wedge 16 to slide over the wedge 17 until the cylindrical surface $16_1$ of the wedge 16 is stopped by the cylindrical surface $15_1$ of the axial housing. Note that the flat surfaces of the wedges 16, 17 in contact are then inclined to the axis of the housing.

The wedging effect due to the sliding on each other of the flat surfaces of the wedges 16, 17 then immobilizes the end $8'_1$ of the leaf spring 8" in the axial housing 15 by clamping that end against the flat part $15_2$ of the housing. The other ends of the leaf springs 8" and 9" and the leaf springs $14'_1$, $14'_2$ are immobilized the same way. For the latter two leaf springs, however, percussion tools must be used of a size that can enter deeply into the axial housings that receive the leaf springs.

The pivot shown in FIGS. 4 to 6 has various advantages. First of all, it includes flat leaf springs, which are easier to fabricate than the leaf springs with looped ends of the pivots shown in FIGS. 1 to 3, and less likely to be damaged by the heat treatment that they must undergo. Above all, the dimensional tolerances in respect of these leaf springs can be less strict, because the bearing surface $17_1$ of the wedge 17 on the leaf spring is away from the end of the leaf spring, so that the length of the latter can therefore vary somewhat without affecting its immobilization. All these features mean that the pivots shown in FIGS. 4 to 6 can be fabricated at low cost.

Various fabrication techniques, such as molding or spark erosion, for example, can be used to fabricate the members 1 and 2 of the pivot according to the invention, those techniques being able to produce members of this kind with relatively complex shapes.

It is now apparent that the invention achieves the stated object. Fixing the leaf springs by wedging them does not degrade the mechanical characteristics of the leaf springs, unlike fixing by welding, and is insensitive to aging and to environmental constraints encountered in space, unlike fixing by gluing. Thus reliable pivots with well-defined and stable performance are produced. Simulating the behavior of this kind of pivot is then easier, so that its performance can be controlled more closely and more reliably. The embodiment shown in FIGS. 4 to 6 is also particularly economical to fabricate.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

There is claimed:

1. A flexural pivot comprising substantially identical first and second members partly engaged in each other and rotatable relative to each other about a common axis against action of a return leaf spring having first and second ends anchored in said first and second members, respectively, in which pivot each of said ends of said leaf spring is wedged in an axial housing provided in one of said members, between a wall portion of said housing and a pair of superposed wedges gripped between another wall portion of said housing and said leaf spring, said leaf spring and said wall portion of said housing on which said leaf spring bears being substantially flat and said other wall portion of said housing and a surface portion of said pair of wedges bearing on said other wall portion being substantially cylindrical.

2. The pivot claimed in claim 1 wherein said wedges bear on each other through two facing flat faces inclined to the axis of said axial housing.

3. The pivot claimed in claim 2, wherein at least one of said wedges also abuts against a key inserted into said axial housing.

4. The pivot claimed in claim 1 wherein each member has a cylindrical portion with a substantially semicylindrical recess and a portion constituting a foot slid axially into said recess of the other member.

5. The pivot claimed in claim 4 wherein said foot has abutment surfaces adapted to cooperate with abutment surfaces of the housing into which it is inserted to delimit the maximum relative angular movement of said two members relative to each other.

6. The pivot claimed in claim 1 including two leaf springs in crossed, substantially perpendicular, planes.

7. The pivot claimed in claim 1 including first, second and third leaf springs and wherein said second leaf spring is disposed between the other two leaf springs so as to straddle a middle part of said pivot.

8. A flexural pivot comprising substantially identical first and second members partly engaged in each other and rotatable relative to each other about a common axis against action of a return leaf spring having first and second ends anchored in said first and second members, respectively, each of said ends of said leaf spring being wedged in an axial housing provided in one of said members against a wall portion of said housing by at least one wedge which abuts against a key inserted into said axial housing, said leaf spring and said wall portion of said housing on which said leaf spring bears being substantially flat, said wedge being gripped between another wall portion of said housing and said leaf spring, and a surface portion of said wedge bearing on said another wall portion being substantially cylindrical.

9. The pivot as set forth in claim 8 wherein said wedge includes a pair of superposed wedges bearing on each other through two facing flat faces inclined to the axis of said axial housing.

10. The pivot as set forth in claim 8 wherein each member has a cylindrical portion with a substantially semicylindrical recess and a portion constituting a foot slid axially into said recess of the other member.

11. The pivot as set forth in claim 10 wherein said foot has abutment surfaces adapted to cooperate with abutment surfaces of the housing into which it is inserted to delimit the maximum relative angular movement of said two members relative to each other.

12. The pivot as set forth in claim 8, including two leaf springs in crossed, substantially perpendicular, planes.

13. The pivot as set forth in claim 8 including first, second and third leaf springs and wherein said second leaf spring is disposed between the other two leaf springs so as to straddle a middle part of said pivot.

14. A flexural pivot comprising substantially identical first and second members partly engaged in each other and rotatable relative to each other about a common axis against action of a return leaf spring having first and second ends anchored in said first and second members, respectively, in which pivot each of said ends of said leaf spring is wedged in an axial housing provided in one of said members, between a wall portion of said housing and a pair of superposed wedges gripped between another wall portion of said housing and said leaf spring, at least one of said wedges abutting against a key inserted into said axial housing.

15. The pivot as set forth in claim 14, wherein said wedge has a cylindrical lateral portion.

* * * * *